United States Patent
Miyazawa et al.

(10) Patent No.: US 9,323,351 B2
(45) Date of Patent: Apr. 26, 2016

(54) INFORMATION PROCESSING APPARATUS, INFORMATION PROCESSING METHOD AND PROGRAM

(75) Inventors: Yusuke Miyazawa, Tokyo (JP); Yasushi Okumura, Tokyo (JP); Seiji Suzuki, Kanagawa (JP)

(73) Assignee: Sony Corporation, Tokyo (JP)

( * ) Notice: Subject to any disclaimer, the term of this patent is extended or adjusted under 35 U.S.C. 154(b) by 110 days.

(21) Appl. No.: 13/416,551

(22) Filed: Mar. 9, 2012

(65) Prior Publication Data

US 2012/0326994 A1 Dec. 27, 2012

(30) Foreign Application Priority Data

Mar. 17, 2011 (JP) ................................. 2011-058987

(51) Int. Cl.
*G06F 3/0346* (2013.01)
*G06F 3/0488* (2013.01)
*H04N 13/00* (2006.01)

(52) U.S. Cl.
CPC ............ *G06F 3/0346* (2013.01); *G06F 3/0488* (2013.01); *H04N 13/0022* (2013.01)

(58) Field of Classification Search
CPC ... G06F 3/048; G06F 3/0484; G06F 3/04845; G06F 3/0487
USPC .................................................. 345/173, 174
See application file for complete search history.

(56) References Cited

U.S. PATENT DOCUMENTS

| 5,574,836 | A | 11/1996 | Broemmelsiek | |
|---|---|---|---|---|
| 2010/0099463 | A1* | 4/2010 | Kim et al. | 455/566 |
| 2010/0131904 | A1* | 5/2010 | Fong et al. | 715/863 |
| 2010/0134312 | A1* | 6/2010 | Park et al. | 340/689 |
| 2010/0295958 | A1 | 11/2010 | Larsson et al. | |
| 2011/0117970 | A1* | 5/2011 | Choi | 455/566 |
| 2012/0032979 | A1* | 2/2012 | Blow et al. | 345/647 |

FOREIGN PATENT DOCUMENTS

| EP | 2 202 626 A2 | 6/2010 |
|---|---|---|
| EP | 2293176 A2 | 3/2011 |
| JP | 2004-54854 | 2/2004 |
| JP | 2004-334642 | 11/2004 |

(Continued)

OTHER PUBLICATIONS

Extended European Search Report issued Jul. 6, 2012, in Munich in corresponding European Application No. EP 12 15 9386.

(Continued)

*Primary Examiner* — Latanya Bibbins
(74) *Attorney, Agent, or Firm* — Paratus Law Group, PLLC (57) ABSTRACT

An information processing apparatus may include a display, a touch acquisition unit, a rotation acquisition unit, and a display control unit. The touch acquisition unit may be configured to receive a proximity signal indicative of a user input to a touch panel of the information processing apparatus. The rotation acquisition unit may be configured to receive a rotation signal indicative of a rotation of the information processing apparatus. The display control unit may be configured to generate a first signal to cause the display to display an image. Additionally, the display control unit may be configured to, when the rotation signal indicates a rotation while the proximity signal indicates a user input, generate a second signal to cause the display to change the image.

20 Claims, 10 Drawing Sheets

(56) References Cited

FOREIGN PATENT DOCUMENTS

| | | |
|---|---|---|
| JP | 2005-245619 | 9/2005 |
| JP | 2009-9252 | 1/2009 |
| JP | 2009-116583 | 5/2009 |
| JP | 2010-109552 | 5/2010 |
| WO | WO 2008/070815 A1 | 6/2008 |
| WO | WO 2010/029506 A1 | 3/2010 |

OTHER PUBLICATIONS

Yutaka Nakai, "Mobile Device, Operation Detecting Method, and Operation Detection Program", English-language translation of JP 2010-109552, (May 13, 2010), 18 pages.
Satoru Itani, "Touch Type Input Device", English-language translation of JP 2009-009252, (Jan. 15, 2009), 9 pages.
Takashi Inoue., "Input Controller and Input Control Method", English-language translation of 2009-116583, (May 28, 2009), 26 pages.
Etsuji Iizuka, "Game Device and Game Program", English-language translation of JP 2005-245619, (Sep. 15, 2005), 38 pages.
Hiroyuki Komori, "Method and System for Input Pointing Device", English-language translation of JP 2004-054854, (Feb. 19, 2004), 16 pages.
Yoshikazu Tanaka, "Operation Input Device and Portable Electronic Apparatus", English-language translation of JP2004-334642, (Nov. 25, 2004), 7 pages.
Jan. 22, 2016, Chinese Office Action for related CN Application No. 201210062123.9.

\* cited by examiner

OFFSET DISPLAY

| DEVICE | SELECTION MANIPULATION | MENU DISPLAY MANIPULATION |
|---|---|---|
| NORMAL TOUCH PANEL | DRAG | RELEASE FINGER |
| PROXIMITY TOUCH PANEL | AIR DRAG | RELEASE FINGER FROM PROXIMITY AREA |
| PRESSURE-SENSITIVE TOUCH PANEL | DRAG | PUSH IN |

INFORMATION PROCESSING APPARATUS, INFORMATION PROCESSING METHOD AND PROGRAM

CROSS-REFERENCE TO RELATED APPLICATION

This application claims priority of Japanese Patent Application No. 2011-058987, filed on Mar. 17, 2011, the entire content of which is hereby incorporated by reference.

BACKGROUND

The present disclosure relates to an information processing apparatus, an information processing method, and a program.

In recent years, computation capability and communication speed of an information processing apparatus are being rapidly improved. However, for example, in a relatively small information processing apparatus such as a portable terminal, a display unit for displaying a processing result has a limited size, such that an amount of information that can be displayed is also limited and high performance as described above may not be sufficiently used.

A technique for effectively utilizing a display unit of an information processing apparatus is being developed. For example, enlarging a display unit while securing a manipulation capability by providing a touch panel in the display unit is known. Techniques using a pushed state of a touch panel as a manipulation input are disclosed in Japanese Patent Laid-open Publication Nos. 2010-109552 and 2009-009252.

Further, a technique for using a state change of a body of an information processing apparatus as a manipulation input and realizing a variety of manipulation inputs without reducing a display unit is also known. A technique using application of vibration to a body as a manipulation input is disclosed in Japanese Patent Laid-open Publication No. 2004-334642. A technique for using tilt of a body as a manipulation input is disclosed in Japanese Patent Laid-open Publication No. 2005-245619

SUMMARY

In an apparatus such as a portable terminal having a touch panel, a manipulation using a touch panel is performed, such that a screen area relative to a size of the apparatus can be relatively large and legibility is excellent. Further, since as much information as possible is displayed in a limited display area, a display unit such as a liquid crystal panel has high definition.

However, when a touch panel manipulation is performed, the manipulation is performed by a user's finger and, accordingly, it is necessary to provide a display area equal to or greater than a certain size. Further, a display object (character, icon or the like) selected by the finger may need to have a size equal to or greater than a certain value to be selected by the finger. Because of this, in particular, in a small terminal such as a portable telephone, if a number of small display objects are displayed, the display object may be enlarged to be selected and a complicated manipulation is necessary. Further, if such an enlargement manipulation is assumed, a high-definition display device capable of originally displaying much information in a limited range may not be sufficiently utilized. Thus, in a device in which the touch panel manipulation is performed, a selected display object may need to have a physical size equal to or greater than a certain value, and if the device is included in a small mobile device, a manipulation using a finger is difficult.

A method of sorting selection objects present near a pen has been proposed in Japanese Patent Laid-open Publication No. 2004-54854. However, since the manipulation objects are rearranged, it takes time for a user to understand a relationship with positions before a manipulation. Further, enlargement/focus-displaying of an object having the closest coordinate of a finger in a proximity state is disclosed in Japanese Patent Laid-open Publication No. 2009-116583. However, in this method, since a display area is hidden by a finger, it is difficult for a limited area to be effectively used.

Further, issuing a command by "shaking" a device has been proposed in Japanese Patent Laid-open Publication No. 2004-334642. However, it is difficult to manipulate a specific object on a display screen by "shaking" the device. Further, moving an object according to a tilt of a game stage is disclosed in Japanese Patent Laid-open Publication No. 2005-245619, but changing a display for a manipulation such as touch by a user is not considered.

It is desirable to provide an information processing apparatus, an information processing method and a program which are new and improved and capable of performing a desired manipulation on a display screen without performing is a complicated manipulation.

Accordingly, there is disclosed an information processing apparatus, which may include a display, a touch acquisition unit, a rotation acquisition unit, and a display control unit. The touch acquisition unit may be configured to receive a proximity signal indicative of a user input to a touch panel of the information processing apparatus. The rotation acquisition unit may be configured to receive a rotation signal indicative of a rotation of the information processing apparatus. The display control unit may be configured to generate a first signal to cause the display to display an image. Additionally, the display control unit may be configured to, when the rotation signal indicates a rotation while the proximity signal indicates a user input, generate a second signal to cause the display to change the image.

There is also disclosed a method of controlling a display of an information processing apparatus. A processor may execute a program to cause an information processing apparatus to perform the method. The program may be stored on a storage medium of the apparatus and/or a non-transitory, computer-readable storage medium. The method may include generating a first signal to cause the display to display an image. The method may also include receiving a proximity signal indicative of a user input to a touch panel of the information processing apparatus. Additionally, the method may include receiving a rotation signal indicative of a rotation of the information processing apparatus. The method may also include, when the rotation signal indicates a rotation while the proximity signal indicates a user input, generating a second signal to cause the display to change the image.

According to the present disclosure, it is possible to provide an information processing apparatus, an information processing method and a program capable of performing a desired manipulation on a display screen without performing complicated manipulation.

DETAILED DESCRIPTION OF THE EMBODIMENT(S)

Hereinafter, embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Figure 1:
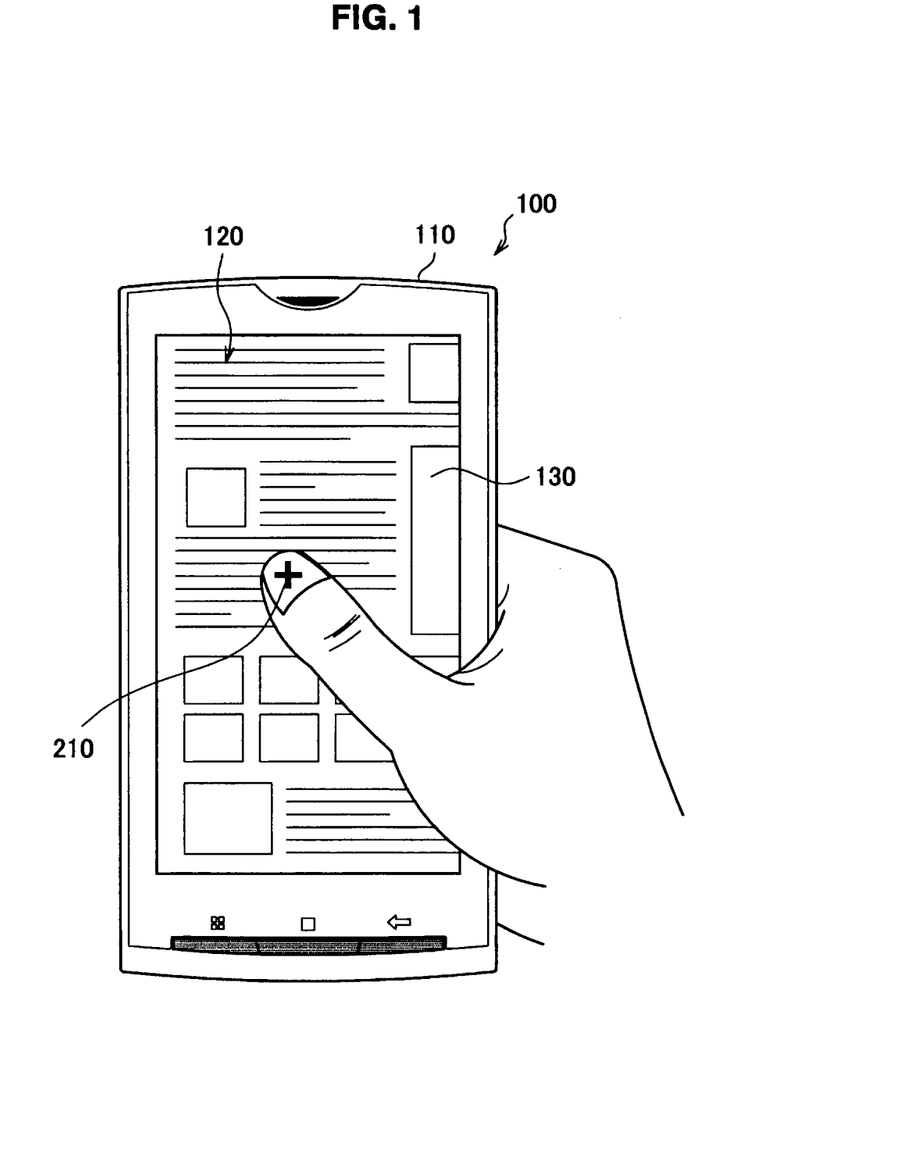
FIG. 1 is a diagram showing an appearance of a portable terminal according to a first embodiment of the present disclosure.

Further, a description is given in the following order.
1. Overview of Present Embodiment
2. Example of Configuration of Portable Terminal
3. Example of Operation of Portable Terminal
4. Process Flow of Portable Terminal FIG. 1 is a diagram showing an appearance of a portable terminal 100 according to the present embodiment. The portable terminal 100 is an example of an information processing apparatus. Referring to FIG. 1, the portable terminal 100 includes a body 110, and an LCD (Liquid Crystal Display) 120 is provided in the body 110. The LCD 120 is an example of a display unit (i.e., a software module, a hardware module, or a combination of a software module and a hardware module), and an image is displayed as an output of the portable terminal 100. Further, the display unit is not limited to the LCD 120, but any display apparatus, such as an organic EL (Electro-Luminescence) panel, may be used. A touch panel 130 is provided in the LCD 120. The touch panel 130 detects proximity of a user to a surface of the LCD 120. Note that "proximity" may include both actual touch contact, as well as non-contacting proximity. Alternatively, if a manipulation unit such as a button is provided, the touch panel 130 may not be provided. The portable terminal 100 may have, for example, various functions such as voice communication, network communication, playing of music or videos, or capturing of moving images or still images. In addition to the LCD 120 and the touch panel 130, other apparatuses, such as a speaker, a microphone, a camera, input/output terminals, or an antenna, for realizing functions of the LCD 120 and the touch panel 130 may be provided in the body 110.

Referring to FIG. 1, an example of an image displayed on the LCD 120 will be described. For example, FIG. 1 shows a state in which a screen of a WEB acquired via a wireless communication network is displayed on the LCD 120. The user can perform a manipulation such as scroll, enlargement and reduction of the WEB screen by manipulating the touch panel 130 and select the character, the icon or the like displayed on the WEB screen.

The portable terminal 100 often has such a size that it is held by a hand, and as shown in FIG. 1, if a manipulation is performed by a finger on the touch panel 130, a portion of the display screen is hidden below the finger. In this case, if a character, an icon or the like is hidden below the finger, it is difficult to view or select the character, the icon or the like.

In this case, in the present embodiment, if the user tilts the portable terminal 100 and views the LCD 120 from a tilted direction, a display state of the display screen displayed on the LCD 120 is changed as if the display screen is viewed from the tilted direction, and a view seen from the tilt direction is provided. Such a process enables the character, the icon or the like located below the finger to be viewed and selected by the user, such that the user can perform a manipulation while confirming an object selected by the finger.

Figure 2:
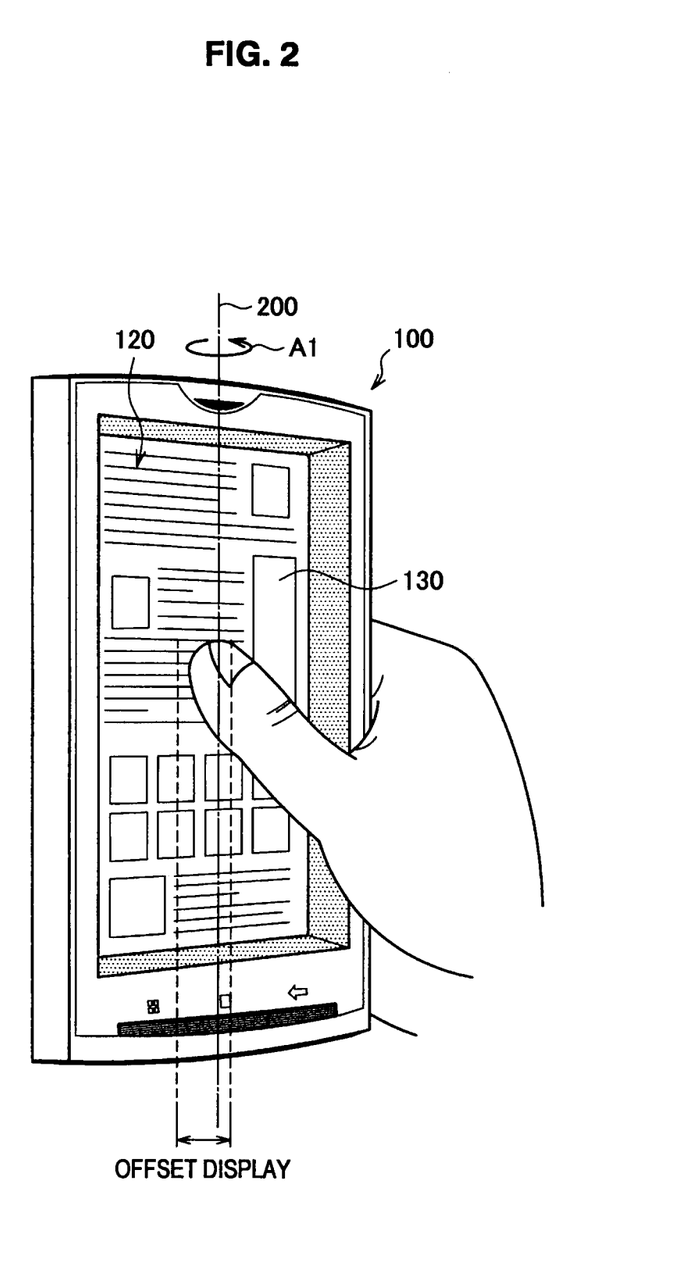
FIG. 2 is a schematic diagram showing a state in which a portable terminal is rotated by a certain angle in a direction indicated by an arrow A1 and an LCD is viewed from a tilted left direction.

FIG. 2 is a schematic diagram showing a state in which the portable terminal 100 is rotated around an axis 200 by a certain angle in a direction indicated by an arrow A1 and the LCD 120 is viewed from a tilted left direction. The portable terminal 100 detects that the portable terminal 100 is rotated from the state shown in FIG. 1 to the state shown in FIG. 2, changes the display of the LCD 120 based on a detection result, and moves the entire screen to the left for offset display. Accordingly, in the state of FIG. 1, the character, the icon or the like located below the finger (a thumb of a right hand) is displayed offset to the left of the finger (i.e., at least a portion of an image is offset with respect to the LCD 120). Accordingly, since the character, the icon or the like hidden below the finger in the state of FIG. 1 is displayed to the left of the finger, the user can view the character, the icon or the like hidden below the finger and perform a manipulation to select the character, the icon or the like. While FIG. 2 only illustrates that rotation around the axis 200 in the direction indicated by the arrow A1 causes movement of the entire screen to the left, it should be understood that rotation around the axis 200 in a direction opposite of the direction indicated by the arrow A1 would cause movement of the entire screen to the right.

Thus, according to the portable terminal 100 of the present embodiment, even when a size of the LCD 120 is relatively small and a finger occupancy size on the LCD 120 is relatively great, a display object located below the finger can be recognized by a simple manipulation to tilt the portable terminal 100. Accordingly, even when the character, the icon or the like hidden below the finger is very small, a desired character, icon or the like can be selected and a desired manipulation can be performed. Hereinafter, a detailed description will be given.

2. Example of Configuration of Portable Terminal

Figure 3:
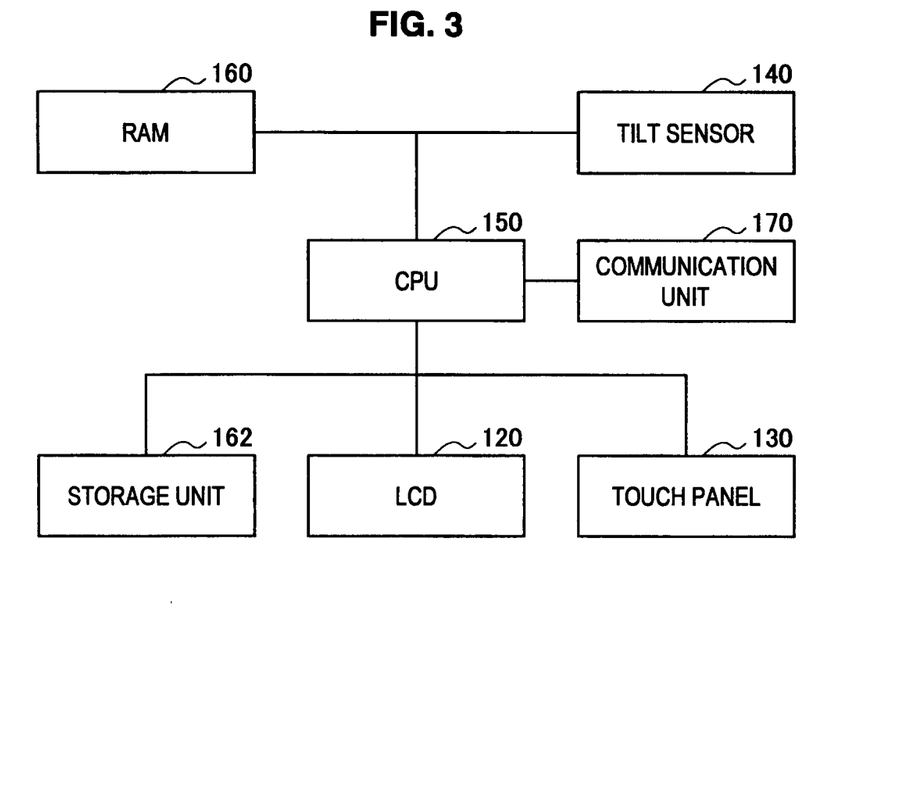
FIG. 3 is a block diagram showing a functional configuration of the portable terminal according to the present embodiment.
Figure 4:
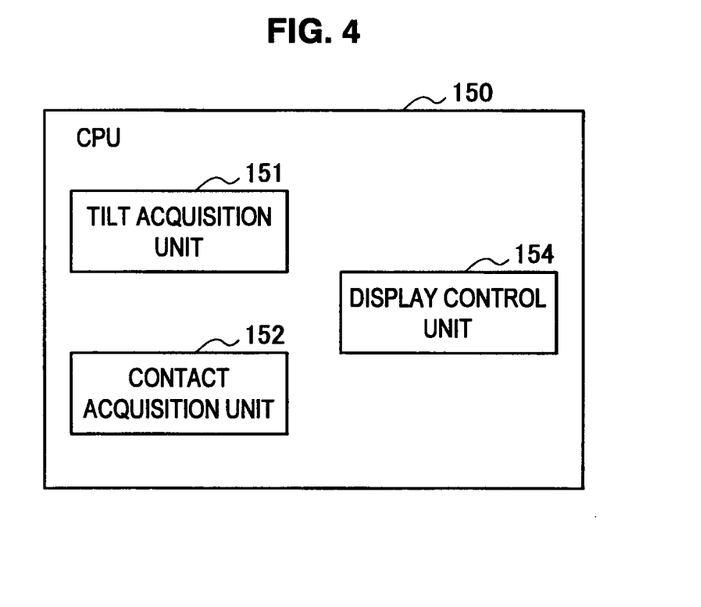
FIG. 4 is a block diagram showing a functional configuration of a CPU.

FIG. 3 is a block diagram showing a functional configuration of the portable terminal 100 according to the present embodiment. Referring to FIG. 3, the portable terminal 100 includes an LCD 120, a touch panel 130, an acceleration sensor (tilt sensor) 140, a CPU (Central Processing Unit) 150, a RAM 160, a storage unit (nonvolatile memory) 162, and a communication unit 170. Further, FIG. 4 is a block diagram showing a functional configuration of the CPU. Functions of a tilt (i.e., rotation) acquisition unit 151, a contact (i.e., touch) acquisition unit 152, and a display control unit 154 shown in FIG. 4 are realized by the CPU 150. The touch panel 130 has, for example, a capacitive touch sensor or a pressure-sensitive touch sensor, and is provided over an entire area on the LCD 120.

The LCD 120 receives a display image from the CPU 150. The touch panel 130 provides the CPU 150 with information of presence or absence of contact or proximity of a user with or to the LCD 120 and a position on the LCD 120 that the user contacts or comes close to (i.e., a proximity signal indicative of a user input to the touch panel 130).

The acceleration sensor 140 is a sensor for detecting acceleration that may be applied to the body 110 of the portable terminal 100. Information of the acceleration detected by the acceleration sensor 140 (i.e., a rotation signal indicative of a rotation of the portable terminal 100) is provided to the CPU 150. Based on a change of the acceleration, for example, a state change of the body 110, such as tilt of the body 110 or vibration of the body 110, can be detected. Further, the acceleration sensor 140 may be, for example, any type of acceleration sensor, such as a biaxial acceleration sensor or a triaxial acceleration sensor, according to a type of state change of the body 110 necessary for a process in the CPU 150. Further, another sensor capable of detecting the state change of the body 110 may be used in place of the acceleration sensor 140. For example, the tilt of the body 110 may be detected based on a result of detecting a face of the user using a sensor capable of recognizing a position of the face of the user in place of the acceleration sensor 140.

The CPU 150 controls operation of each unit of the portable terminal 100. FIG. 4 is a block diagram showing a functional configuration of the CPU 150. The CPU 150 is a processor for executing a program stored in the storage unit 160. The CPU 150 realizes the functions of the tilt acquisition unit 151, the contact acquisition unit 152, and the display control unit 154 shown in FIG. 4 by executing a program. In addition to such functions, the CPU 150 realizes various functions of the portable terminal 100 such as voice communication, network communication, playing of music or videos, or capturing of moving images or still images. In order to realize the functions, the CPU 150 acquires information from the touch panel 130 and the acceleration sensor 140 and provides an image to the LCD 120, and exchanges data with the RAM 160, the storage unit 160 and the communication unit 170. Further, the CPU 150 may acquire or provide information with other devices of the portable terminal 100 to realize the above functions.

Hereinafter, the respective functions of the tilt acquisition unit 151, the contact acquisition unit 152, and the display control unit 154 realized by the CPU 150 will be described. These functions are realized by the CPU 150 executing the program stored in the storage unit 160 as described above, but the present disclosure is not limited thereto. For example, some or all of the functions may be realized by a dedicated circuit configuration separately provided from the CPU 150. Further, the program may be stored, for example, in an external memory separate from the portable terminal 100 and connected to the portable terminal 100.

The tilt acquisition unit 151 acquires the tilt of the body 110 based on the acceleration information of the body 110 of the portable terminal 100 provided from the acceleration sensor 140. Specifically, the tilt acquisition unit 151 may calculate a direction and an angle of the tilt (i.e., amount of rotation) of the body 110 about an axis parallel to a surface of the LCD 120 based on a direction and a size of the acceleration of the body 110. The tilt acquisition unit 151 may provide the calculated direction and angle of the tilt of the body 110 to the display control unit 154.

In the following description, a case in which a character displayed on the LCD 120 is selected by a drag manipulation, a menu is displayed, and then a process according to the menu is performed on the selected character will be described by way of example. The contact acquisition unit 152 acquires information of presence or absence of contact or proximity of a user with or to the LCD 120 and a position on the LCD 120 that the user contacts or comes close to, which are provided from the touch panel 130. For example, if the touch panel 130 is configured of a capacitive sensor, the contact acquisition unit 152 may acquire the information of presence or absence of the contact or proximity of the user with or to the LCD 120 and the position on the LCD 120 that the user contacts or comes close to based on a change of a capacitance value provided from the touch panel 130. If the contact acquisition unit 152 detects that the user comes close within a given distance instead of contacting the LCD 120, for example, based on the change of the capacitance value, the contact acquisition unit 152 may acquire position information of the user contacting the LCD 120 and may receive a selection manipulation. Further, for example, the contact acquisition unit 152 may acquire contact or proximity with or to an area on the LCD 120 in which an icon (or character) is displayed, for example, as an icon pressing manipulation. Further, if the contact or the proximity with or to the area on the LCD 120 in which the icon or the like is displayed is continued for a given time or more, the contact acquisition unit 152 may acquire this contact, for example, as an icon pressing and holding manipulation. Further, when a contact position is moved in a state in which the contact on the LCD 121 is continued, the contact acquisition unit 152 may acquire this contact as a movement manipulation (referred also to as a flick manipulation). The contact acquisition unit 152 may acquire the pressing manipulation, the pressing and holding manipulation, or the movement manipulation, for example, for icons and provide the manipulation to the display control unit 154.

Figure 5A:
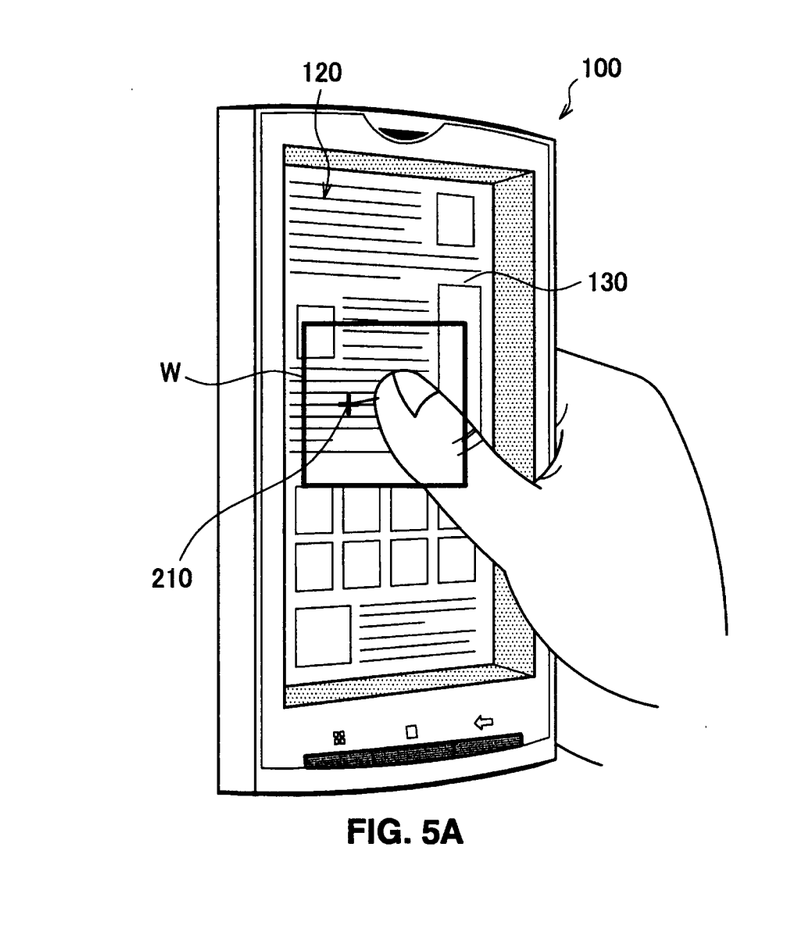
FIG. 5 is a diagram showing an example of operation of the portable terminal according to the present embodiment.
Figure 5B:
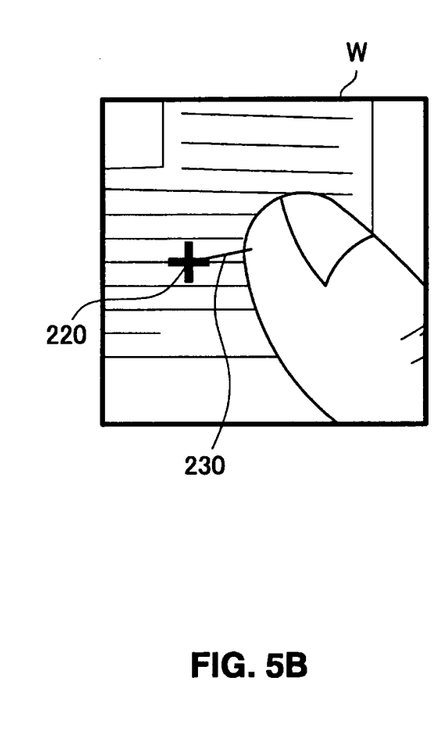

The display control unit 154 provides a display image to the LCD 120 (i.e., generates a signal to cause the LCD 120 to display the display image). Further, the display control unit 154 changes the display image (i.e., generates a signal to cause the LCD 120 to change the display image) based on the information of the tilt of the body 110 acquired by the tilt acquisition unit 151. Specifically, the display control unit 154 performs offset display as shown in FIGS. 2, 5A and 5B based on the information of the tilt of the body 110. Here, the display control unit 154 may change the display image based on the tilt of the body 110 acquired by the tilt acquisition unit 151 and some or all of various contact manipulations acquired by the contact acquisition unit 152. This display change includes at least the display change according to the tilt of the body 110 acquired by the tilt acquisition unit 151. Further, the display control unit 154 controls the display according to a user manipulation on the display screen based on the user contact or proximity information acquired by the contact acquisition unit 152. For example, the display control unit 154 performs a process of scrolling, enlarging or reducing the screen according to the manipulation of the user. Further, the display control unit 154 performs, for example, a process of causing the character, the icon or the like selected according to the drag manipulation of the user to be in a display state according to the selection or a process of displaying a menu screen after the selection manipulation is performed, and outputs a processing result to the LCD 120.

Various data about the process of the portable terminal 100 is temporarily or permanently stored in the RAM 160 and the storage unit 162. The RAM 160 includes a semiconductor memory such as a DRAM, and temporarily stores, for example, data of the display screen. Further, the storage unit 162 may be a nonvolatile storage device, for example, an optical disc such as a flash ROM (Read Only Memory), a BD (Blu-ray disc), a DVD (Digital Versatile Disc), or CD (Compact Disc), or a hard disk. The storage unit 162 may be a storage device embedded in the portable terminal 100 or a removable medium (i.e., a non-transitory, computer-readable storage medium) such as a memory card detachably provided in the portable terminal 100. Alternatively, the storage unit 162 may include a plurality of types of storage devices or removable media. A program executed by the CPU 150 to realize the functions of the tilt acquisition unit 151, the contact acquisition unit 152, and the display control unit 154, and various other functions may be stored in the storage unit 162. This program may be stored in the storage unit 162 in advance. A program stored and provided in the removable medium or a program downloaded from a network via the communication unit 170 may be temporarily stored in the RAM 160 or the storage unit 162. Further, information exchanged between the CPU 150 and the LCD 120, the touch panel 130, the acceleration sensor 140, and the communication unit 170 and information generated through the process in the CPU 150 may be temporarily stored in the RAM 160 or the storage unit 16.

The communication unit 170 is a communication interface that includes a communication device for connection to a network. The communication unit 170 may be, for example, a port or a communication card for USB (Universal Serial Bus), IEEE1394, SCSI (Small Computer System Interface), HDMI (High-Definition Multimedia Interface), LAN (Local Area Network), Bluetooth (registered trademark), or WUSB (Wireless USB). The communication unit 170 connects to a network such as the Internet, home LAN, infrared communication, radio wave communication or satellite communication, and exchanges various data about the process of the portable terminal 100. The communication unit 170 may download a program executed by the CPU 150 in order to realize the functions of the tilt acquisition unit 151, the contact acquisition unit 152, and the display control unit 154, and various other functions from a network, and store the program in the storage unit 160.

3. Example of Operation of Portable Terminal

FIG. 5 is a diagram showing an example of operation of the portable terminal 100 according to the present embodiment. FIG. 5A shows the same state as in FIG. 2, in which a state in which the portable terminal 100 is tilted by a certain angle around an axis 200 from the state in FIG. 1 is shown. FIG. 5B is a schematic diagram showing a display state of the LCD 120 in a range indicated by a frame W in FIG. 5A.

In the state shown in FIG. 1, the contact acquisition unit 152 of the CPU 150 acquires a position of the cross 210 shown in FIG. 1 as information of a position on the LCD 120 that the user contacts. If the portable terminal 100 is tilted to be in the state shown in FIG. 5A, the CPU 150 acquires tilt information using the tilt acquisition unit 151 and the display control unit 154 changes the display image as shown in FIGS. 5A and 5B based on the tilt information.

Specifically, a display screen corresponding to the position of the cross 210 is hidden below the user's finger (a thumb of a right hand) in the state of FIG. 1. On the other hand, in a state of FIGS. 5A and 5B in which the portable terminal 100 has been tilted, a display object corresponding to the position of the cross 210 in FIG. 1 is offset to the position of the cross 220, and the entire screen is also offset to the left according to the offsetting of the display object. The cross 220 is displayed as a cursor indicating a position selected by the user. Since a relative positional relationship between the finger and the selected position is shown on the display screen, a straight line 230 connecting the cross 220 indicating the selected position (cursor) and an actual contact or proximity position of the finger is displayed. Accordingly, the user can easily recognize a position on the display screen selected by the finger by recognizing the position of the cross 220. Accordingly, the user can view the display object present in the position of the cross 210 in FIG. 1 and hidden behind the finger and perform a manipulation such as selection of the display object.

Figure 6:
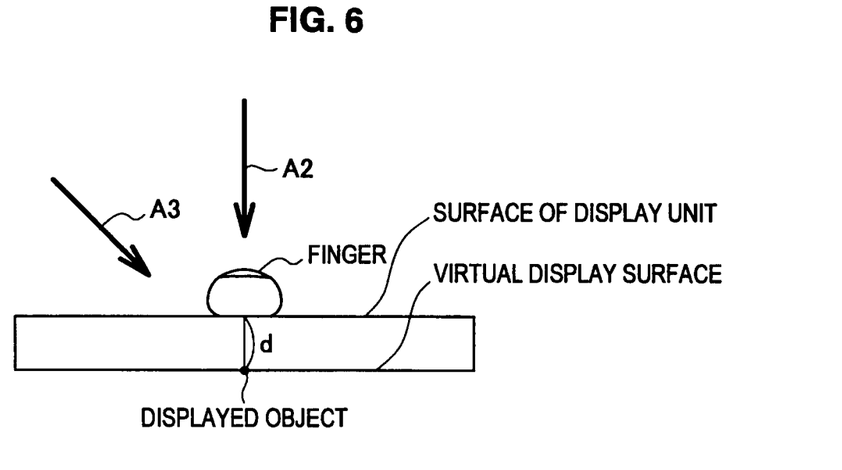
FIG. 6 is a schematic diagram illustrating a display state shown in FIG. 5B.

FIG. 6 is a schematic diagram illustrating the display state shown in FIGS. 5A and 5B. FIG. 6 schematically shows a state in which a finger contacting a surface of the LCD 120 is viewed from a direction along the display surface. In FIG. 6, a display object located below the finger is assumed to be present at a distance d downward from the display surface. As shown in FIG. 6, the display object located below the finger is hidden behind the finger and not viewed when viewed from a direction indicated by an arrow A2. On the other hand, the display object can be viewed when viewed from a direction indicated by an arrow A3. According to the present embodiment, as the offset display shown in FIGS. 5A and 5B is performed, a display effect can be obtained as if the display object is present at the distance d downward from the display surface, as shown in FIG. 6, and the display object located below the finger can be viewed.

In the present embodiment, if the contact or the proximity of the finger of the user is acquired, the offset display is performed. Accordingly, if the user does not put the finger on the LCD 120 and the finger does not contact or come close to the surface of the LCD 120, the offset display is not performed even when the body 110 is tilted. Also, once the offset display is performed, if the user removes the finger from the LCD 120, the offset display is undone even when the body 110 is tilted. This is because the display object is hidden below the finger when the user performs a touch manipulation, and the display object is viewed when there is no finger on the LCD 120. Accordingly, if the user performs a touch manipulation, the display object hidden below the finger can be reliably viewed and, otherwise, the display state can be prevented from being onerously switched.

Figure 9:
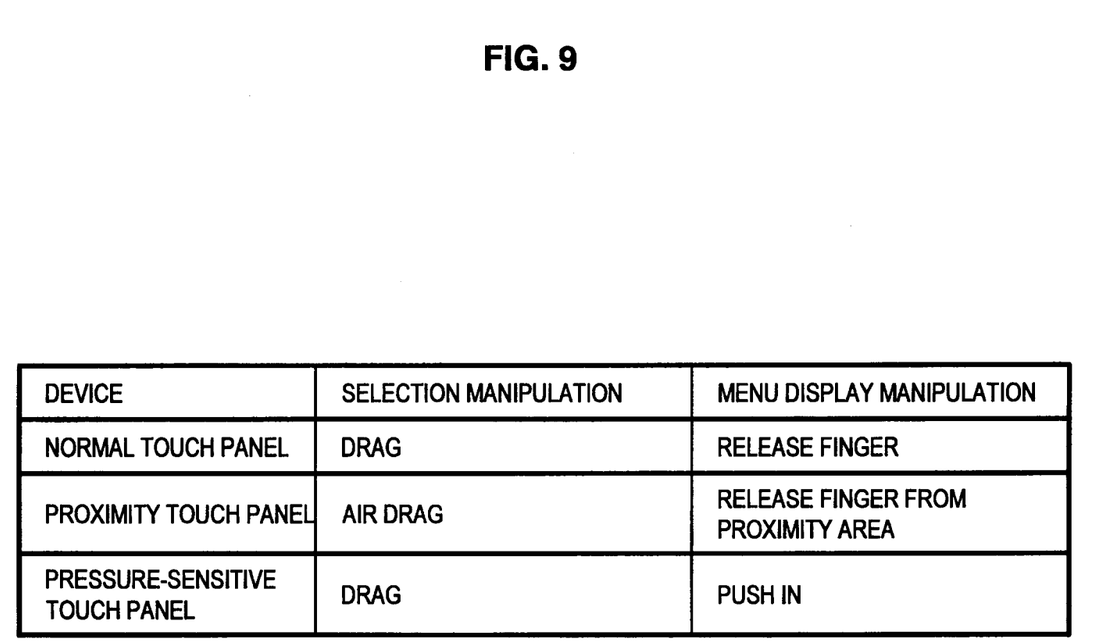
FIG. 9 is a schematic diagram showing a selection manipulation of a display object by a user, and an example of a menu display after selection.

As described above, in the present embodiment, if the portable terminal 100 is tilted, the offset display is performed, such that the display object such as the character or the icon hidden behind the finger can be viewed, the display object can be selected by a manipulation such as a drag, and a menu corresponding to the selected display object can be displayed. Here, FIG. 9 is a schematic diagram showing an example of a manipulation when a display object is selected and a menu display manipulation after the selection. In the selection of the display object and a menu display manipulation after selection termination, a combination as shown in FIG. 9 is considered as an example. In a normal touch panel, a selection of the character, the icon or the like on the LCD 120 is performed by a drag manipulation. After the character, the icon or the like is selected by the drag, the finger is released from the touch panel to display a menu.

Further, in a proximity touch panel (capacitive touch panel), detection of a change of capacitance enables a manipulation to be performed in a state in which the finger comes close to the display surface without the finger contacting the display surface. In such a touch panel, a selection can be performed on the display screen by an air drag manipulation in a state in which the finger comes close to a proximity area in which capacitance change occurs, and the menu can be displayed by moving the finger away from the proximity area. Further, in a pressure-sensitive touch panel, a selection can be performed by a drag on the display screen, and then a menu can be displayed by pushing the finger. In any of the touch panels, if a menu is displayed, a desired manipulation can be performed on the selected icon according to the menu.

Figure 7:
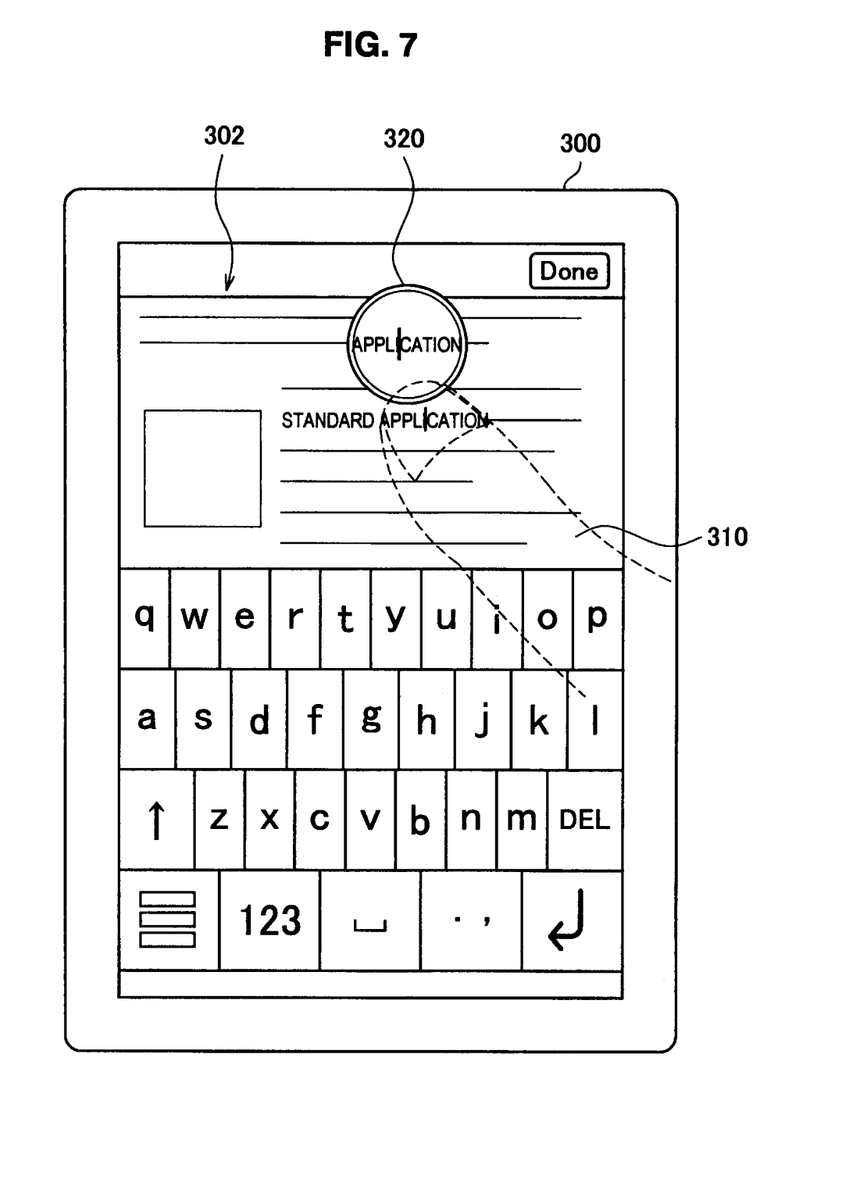
FIG. 7 is a schematic diagram showing a comparative example in which an area pointed by a finger is displayed enlarged.

FIG. 7 is a schematic diagram showing a comparative example in which an area pointed by a finger is displayed enlarged. FIG. 7 shows a state in which a character string and a keyboard are displayed on the display unit 302 of the portable terminal 300. The display unit 302 includes a touch panel. If a user points to the vicinity of a portion "application" in the character string with the finger 310, since the pointed portion is hidden by the finger 310 and not viewed, the pointed portion and an ambient area thereof are displayed enlarged in a circle 320 in the portion on the finger 310 as if they were enlarged by an enlargement mirror. However, in the comparative example shown in FIG. 7, an enlargement display range in the circle 320 is very narrow and other areas are hidden behind the finger 310. Further, in the comparative example shown in FIG. 7, if a character, an icon or the like hidden behind the finger 310 is selected, it is enlarged in the area of the circle 320 and then a selection manipulation, a menu display manipulation or the like may need to be performed. Thus, efforts are taken twice and it is difficult to intuitively perform a fast manipulation while viewing the screen.

On the other hand, in the present embodiment, the entire display screen, including an area originally hidden behind the finger, is displayed offset on the LCD 120 by tilting the portable terminal 100. Since the position of the cross 220 indicating the cursor moves by moving the finger, a desired position and range can be pointed from the entire area of the display screen by a one-touch manipulation even when the character, the icon or the like is much smaller than the finger.

Figure 8:
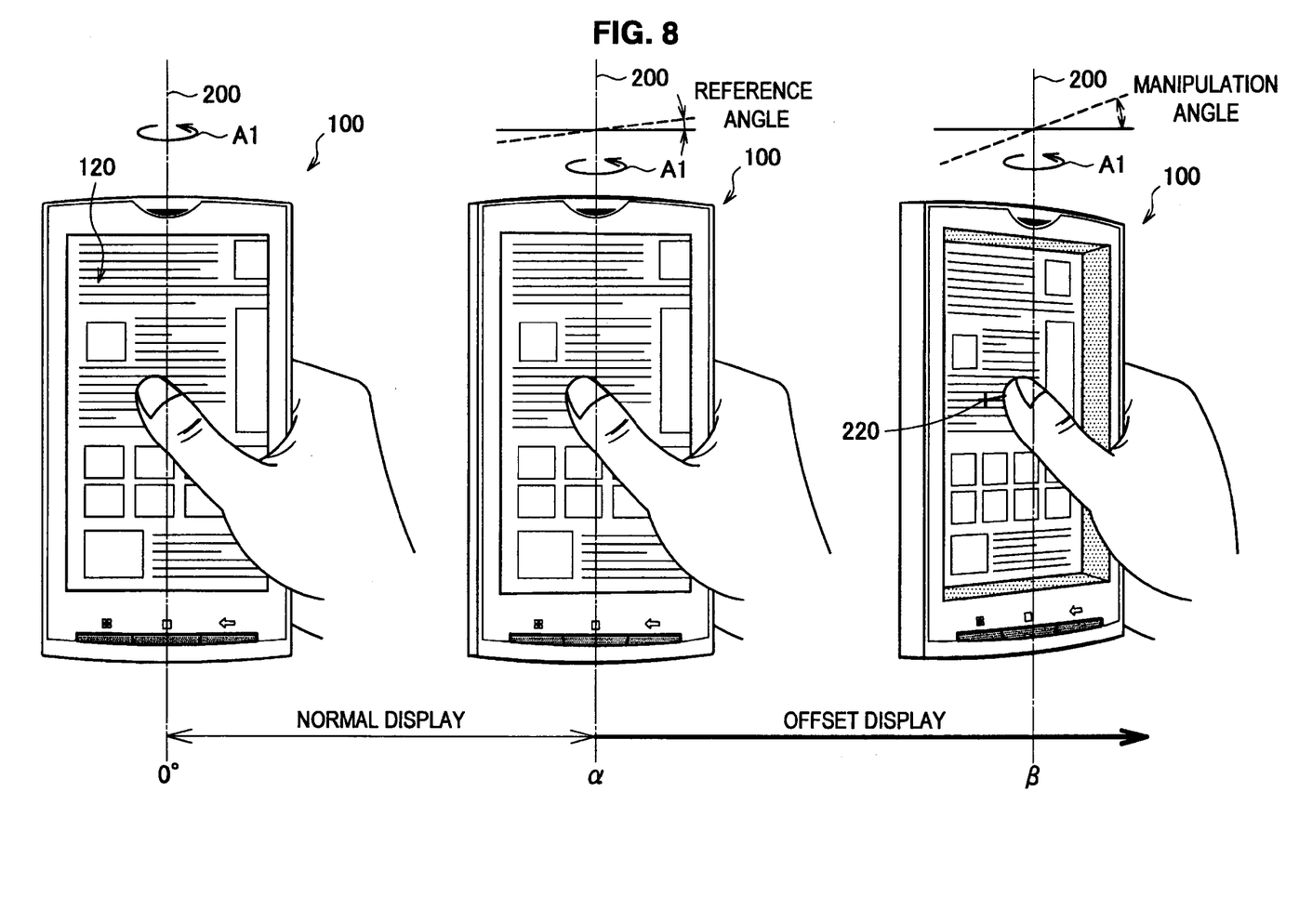
FIG. 8 is a schematic diagram showing a process of switching from a normal display to offset display of FIG. 2 when a portable terminal is rotated around an axis in a direction indicated by an arrow A1.

Further, a display offset amount in the LCD 120 may not be necessarily changed according to a tilt amount of the portable terminal 100. For example, if the tilt of the portable terminal 100 exceeds a certain value (a reference angle α (i.e., a threshold amount of rotation)) as shown in FIG. 8, a display state may be switched. FIG. 8 is a schematic diagram showing a process of switching from a normal display to the offset display of FIG. 2 when the portable terminal 100 is rotated around an axis 200 in a direction indicated by an arrow A1 and tilted. As shown in FIG. 8, if an angle in a state in which the LCD 120 and the user are arranged face to face is 0°, the offset display is not performed but a normal display is performed on the LCD 120 in a range from 0° to the reference angle α.

On the other hand, if the portable terminal 100 is tilted in excess of the reference angle α, the display state of the LCD 120 is switched and the offset display is performed. Accordingly, in a state of a manipulation angle β shown in FIG. 8, the offset display is performed. Thus, the normal display is performed in the range from 0° to the reference angle α, such that if the user does not intend the offset display, the display state can be prevented from being onerously switched according to a small change of the tilt. If the portable terminal 100 is tilted in excess of the reference angle α, the display offset amount may be changed according to a tilt amount. Further, the portable terminal 100 is titled in excess of the reference angle α, the offset amount may be constant though the tilt amount is changed.

Further, setting and releasing (i.e., undoing) the offset display can be performed according to a tilt direction of the portable terminal 100. As shown in FIG. 8, if the portable terminal 100 is rotated over the reference angle α in a direction indicated by the arrow A1, the offset display is performed, and if the portable terminal 100 is rotated in a reverse direction of the arrow A1 and an angle is equal to or smaller than the reference angle α, the offset display may be released.

Figure 10:
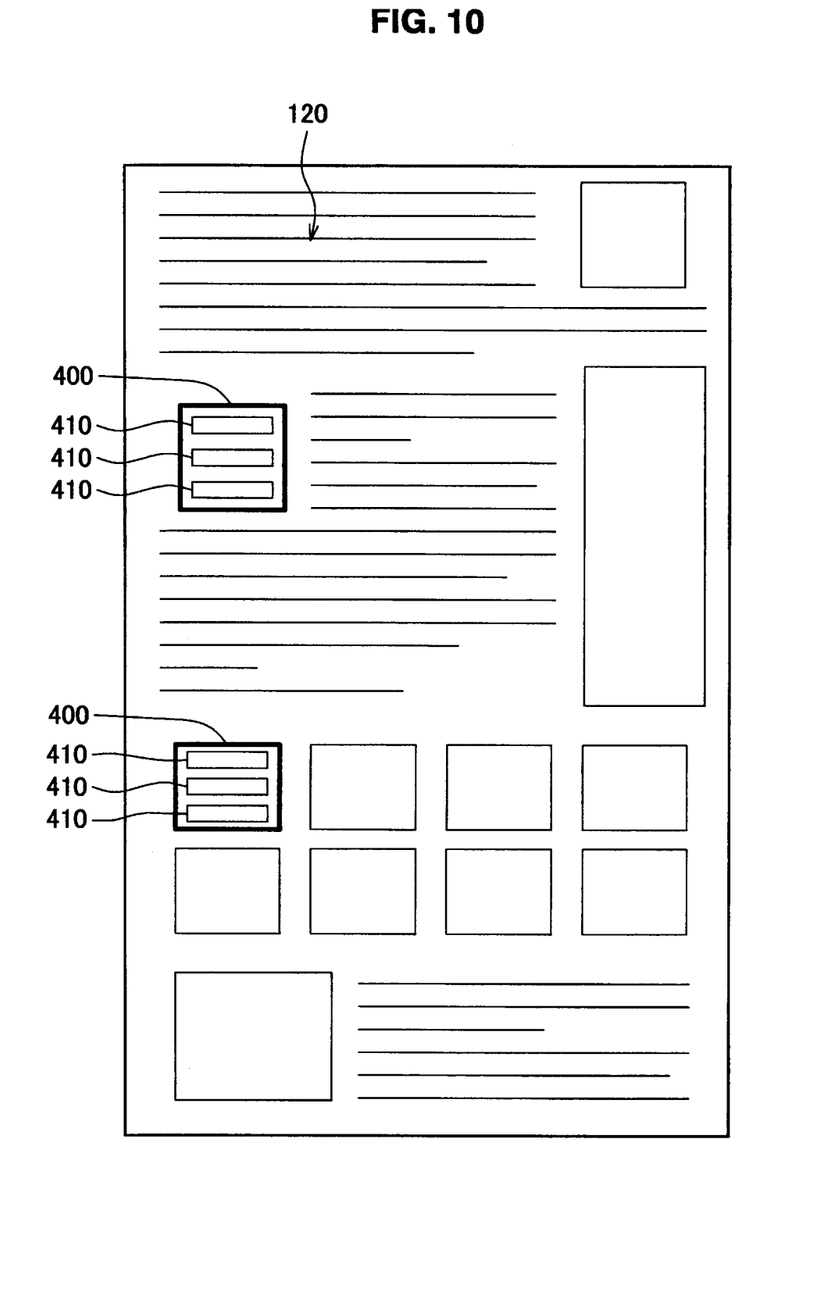
FIG. 10 is a schematic diagram showing a case in which selection objects such as news screens on a WEB are densely present in a certain range.

Further, the offset display is not limited to the case in which a one-dimensional selection manipulation such as a character selection is performed. For example, the offset display may also be used when selection objects 410 such as news screens on a WEB are densely present in a certain range 400, as shown in FIG. 10.

4. Process Flow of Portable Terminal

Figure 11:
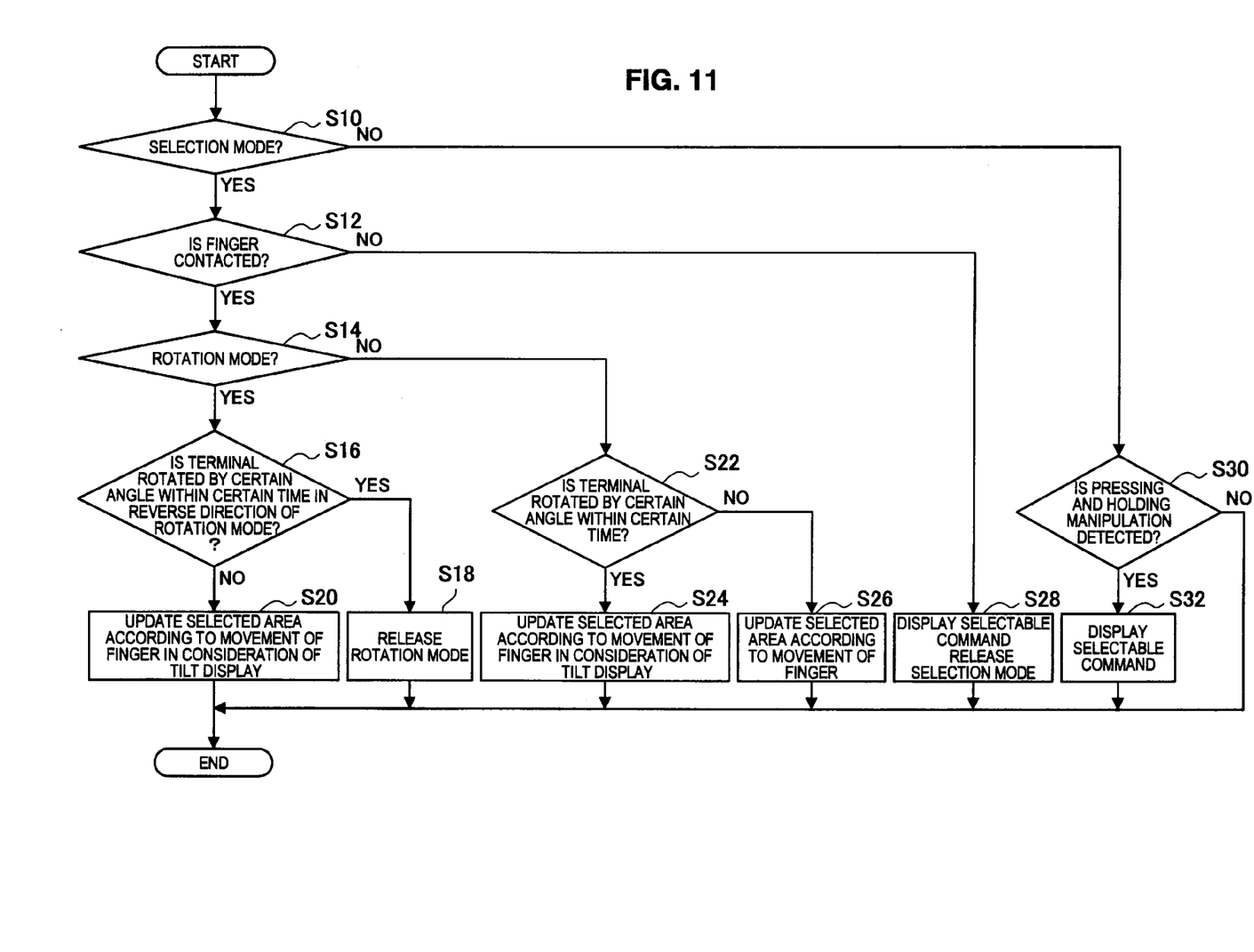
FIG. 11 is a flowchart showing a procedure of a process in the portable terminal of the present embodiment.

FIG. 11 is a flowchart showing a procedure of a process in the portable terminal 100 of the present embodiment. In FIG. 11, a mode in which a character, an icon or the like is selectable on the display screen of the LCD 120 is referred to as a selection mode. Further, in the selection mode, a mode in which a body is tilted over a reference angle α and offset display is performed is referred to as a rotation mode.

First, if the tilt of the portable terminal 100 is changed in step S10, a judgment is first made as to whether a current mode is the selection mode. If the mode is the selection mode, the process proceeds to step S12. In step S12, a judgment is made as to whether a finger has made contact (i.e., whether the proximity signal indicates a user input). If the finger has made contact, the process proceeds to step S14.

In the subsequent step S14, a judgment is made as to whether a mode is the rotation mode. If the rotation mode is previously set, the process proceeds to step S16. In step S16, a determination as to whether the portable terminal 100 is rotated over a certain angle within a certain time in a reverse direction of a rotation direction when the rotation mode is set. In step S16, if the portable terminal 100 is rotated over a certain angle within a certain time, the process proceeds to step S18, in which the rotation mode is released. On the other hand, if the portable terminal 100 is not rotated over a certain angle within a certain time in step S16, the process proceeds to step S20, in which the rotation mode is maintained and a selected area is updated according to a movement of the finger in consideration of tilt display.

Further, if a mode is not the rotation mode in step S14, the process proceeds to step S22. In step S22, a judgment is made as to whether the portable terminal 100 is rotated (i.e., whether the rotation signal indicates a rotation) over a certain angle within a certain time. If it is judged in step S22 that the portable terminal 100 is rotated over a certain angle within a certain time, the rotation mode is set and the process proceeds to step S24. In step S24, the selected area is updated according to the movement of the finger in consideration of the tilt display. On the other hand, if the portable terminal 100 is not rotated over a certain angle within a certain time in step S22, the process proceeds to step S26 without setting the rotation mode. In step S26, the selected area is updated according to the movement of the finger in a normal display mode.

Further, if the finger does not make contact in step S12, the process proceeds to step S28. In step S28, a selectable command is displayed and the selection mode is released.

If the mode is not the selection mode in step S10, the process proceeds to step S30, in which it is detected whether a pressing and holding manipulation is performed by the user. If the pressing and holding manipulation is performed, the process proceeds to step S32, the selection mode is set and a selectable command is displayed. If the pressing and holding manipulation is not performed, the process ends.

According to the present embodiment as described above, if the portable terminal 100 is tilted, the offset display is performed, such that a display object of the character, the icon or the like hidden behind the finger can be viewed. Thus, such a display object can be selected by a manipulation such as a drag and a desired manipulation can be performed.

The preferred embodiments of the present disclosure have been described in detail with reference to the accompanying drawings, but the present disclosure is not limited to such examples. It should be understood by those skilled in the art that various modifications, combinations, sub-combinations and alterations may occur depending on design requirements and other factors insofar as they are within the scope of the appended claims or the equivalents thereof. Further, it should be understood that, as used herein, the indefinite articles "a" and "an" mean "one or more" in open-ended claims containing the transitional phrase "comprising," "including," and/or "having."

For example, in each embodiment, the portable terminal has been described as an example of the information processing apparatus, but the present disclosure is not limited to such an example. The information processing apparatus may be, for example, any apparatus that includes a display unit and can be tilted by a user, such as a tablet PC (Personal Computer) or a portable game machine.

For example, the present technology can adopt the following configurations.

(1) An information processing apparatus comprising:
 a tilt acquisition unit for acquiring tilt of a body in which a display unit on which an image is displayed is provided;
 a contact acquisition unit for acquiring contact or proximity of a user with or to the display unit; and
 a display control unit for making a display change in the displayed image based on the acquired tilt of the body if the contact or the proximity is acquired.

(2) The information processing apparatus according to the (1), wherein the display control unit displays the displayed image offset based on the acquired tilt of the body.

(3) The information processing apparatus according to the (1), wherein the display control unit makes the display change in the displayed image if an angle of the acquired tilt of the body is equal to or greater than a given threshold.

(4) The information processing apparatus according to the (1), wherein the display control unit returns the display change to an original state if the body is tilted in a reverse direction of the acquired tilt of the body after the display control unit makes the display change based on the acquired tilt of the body.

(5) The information processing apparatus according to the (2), wherein the display control unit displays the displayed image offset and displays a cursor indicating a position on the display unit pointed by a user offset from a position in which the contact or proximity is acquired.

(6) The information processing apparatus according to the (5), wherein the display control unit performs a display to indicate a relationship between a position of the cursor that is displayed offset and a position in which the contact or proximity is acquired.

(7) An information processing method comprising:
 acquiring tilt of a body in which a display unit on which an image is displayed is provided;
 acquiring contact or proximity of a user with or to the display unit; and
 making a display change in the displayed image based on the acquired tilt of the body if the contact or the proximity is acquired.

(8) A program for causing a computer to function as:
 a device configured to acquire tilt of a body in which a display unit on which an image is displayed is provided;
 a device configured to acquire contact or proximity of a user with or to the display unit; and
 a device configured to make a display change in the displayed image based on the acquired tilt of the body if the contact or the proximity is acquired.

What is claimed is:

1. An information processing apparatus, comprising:
 a display;
 a touch acquisition unit configured to receive a proximity signal indicative of a user input to a touch panel of the information processing apparatus;
 a rotation acquisition unit configured to receive a rotation signal indicative of a rotation of the information processing apparatus; and
 a display control unit configured to:
  generate a first signal to cause the display to display an image; and
  when the rotation signal indicates a rotation while the proximity signal indicates a user input, generate a second signal to cause the display to change the image,
 wherein the display control unit is configured to generate the second signal to cause the display to change the image by offsetting, based on a direction of the rotation of the information processing apparatus, at least a portion of the image with respect to the display,
 wherein the offsetting of at least the portion of the image brings into clearer view an area of the image, located at a position of the display corresponding to the position of the user input, that is at least partially visually obstructed behind an operator that provides the user input, and
 wherein the at least the portion of the image is offset in a direction such that the area of the image located at the position of the display corresponding to the position of the user input is visually depicted as being offset, from an initial displaying of the at least the portion of the image at a first display position that is located directly underneath the operator in a depth direction, to the changed image which comprises a shifting into the display of the at least the portion of the image at the first display position such that the at least the portion of the image is three-dimensionally projected into the display in the depth direction and visually depicted to be located a distance d perpendicularly downward from a surface of the display and also located a distance perpendicularly downward from the operator such that the at least the portion of the image is shifted into unobstructed view from a previous condition of being at least partially visually obstructed behind the operator.

2. The information processing apparatus of claim 1, wherein the rotation acquisition unit is configured to determine an amount of rotation of the information processing apparatus about an axis parallel to a surface of the display, based on the rotation signal.

3. The information processing apparatus of claim 2, wherein the display control unit is configured to generate the second signal only when the determined amount of rotation exceeds a threshold amount of rotation.

4. The information processing apparatus of claim 1, wherein the rotation acquisition unit is configured to determine the direction of the rotation of the information processing apparatus about an axis parallel to a surface of the display, based on the rotation signal.

5. The information processing apparatus of claim 1, wherein the display control unit is further configured to generate the second signal to:
 cause the display to change the image by adding a cursor to the image identifying a position of the user input; and cause the display to change the image by offsetting at least the portion of the image, including the cursor, with respect to the display.

6. The information processing apparatus of claim 5, wherein the display control unit is configured to, when the proximity signal indicates the position of the user input has changed, generate a third signal to cause the display to further change the image by moving the cursor such that the cursor identifies the changed position of the user input.

7. The information processing apparatus of claim 5, wherein the display control unit is configured to generate the second signal to cause the display to change the image by adding a line to the image connecting the offset cursor to the position of the user input.

8. The information processing apparatus of claim 1, wherein the display control unit is configured to, after generating the second signal, when the proximity signal indicates no user input while the rotation signal indicates a rotation, generate a third signal to cause the display to undo the changes to the image caused by the second signal.

9. The information processing apparatus of claim 1, wherein the touch acquisition unit is configured to receive the proximity signal from a capacitive touch sensor.

10. The information processing apparatus of claim 1, wherein the touch acquisition unit is configured to receive the proximity signal from a pressure-sensitive touch sensor.

11. The information processing apparatus of claim 1, wherein the rotation acquisition unit is configured to receive the rotation signal from an acceleration sensor.

12. The information processing apparatus of claim 1, wherein the rotation acquisition unit is configured to receive the rotation signal from a camera.

13. The information processing apparatus of claim 1, wherein the display control unit generates the second signal to cause the display to change the image by offsetting the entire image with respect to the display.

14. The information processing apparatus of claim 1, wherein the offsetting of at least the portion of the image is performed while the user input is maintained onto the touch panel.

15. The information processing apparatus of claim 1, wherein the offsetting of at least the portion of the image is performed while the user input is maintained onto a same position of the touch panel while the information processing apparatus is concurrently rotated.

16. The information processing apparatus of claim 1, wherein the direction in which the at least the portion of the image is offset is substantially opposite in direction to the direction of the rotation of the information processing apparatus.

17. A method of controlling a display of an information processing apparatus, comprising:
generating a first signal to cause a display to display an image;
receiving a proximity signal indicative of a user input to a touch panel of the information processing apparatus;
receiving a rotation signal indicative of a rotation of the information processing apparatus; and
when the rotation signal indicates a rotation while the proximity signal indicates a user input, generating a second signal to cause the display to change the image,
wherein the second signal is generated to cause the display to change the image by offsetting, based on a direction of the rotation of the information processing apparatus, at least a portion of the image with respect to the display,
wherein the offsetting of at least the portion of the image brings into clearer view an area of the image, located at a position of the display corresponding to the position of the user input, that is at least partially visually obstructed behind an operator that provides the user input, and
wherein the at least the portion of the image is offset in a direction such that the area of the image located at the position of the display corresponding to the position of the user input is visually depicted as being offset, from an initial displaying of the at least the portion of the image at a first display position that is located directly underneath the operator in a depth direction, to the changed image which comprises a shifting into the display of the at least the portion of the image at the first display position such that the at least the portion of the image is three-dimensionally projected into the display in the depth direction and visually depicted to be located a distance d perpendicularly downward from a surface of the display and also located a distance perpendicularly downward from the operator such that the at least the portion of the image is shifted into unobstructed view from a previous condition of being at least partially visually obstructed behind the operator.

18. A non-transitory, computer-readable storage medium storing a program that, when executed by a processor, causes an information processing apparatus to:
generate a first signal to cause a display to display an image;
receive a proximity signal indicative of a user input to a touch panel of the information processing apparatus;
receive a rotation signal indicative of a rotation of the information processing apparatus; and
when the rotation signal indicates a rotation while the proximity signal indicates a user input, generate a second signal to cause the display to change the image,
wherein the second signal is generated to cause the display to change the image by offsetting, based on a direction of the rotation of the information processing apparatus, at least a portion of the image with respect to the display,
wherein the offsetting of at least the portion of the image brings into clearer view an area of the image, located at a position of the display corresponding to the position of the user input, that is at least partially visually obstructed behind an operator that provides the user input, and
wherein the at least the portion of the image is offset in a direction such that the area of the image located at the position of the display corresponding to the position of the user input is visually depicted as being offset, from an initial displaying of the at least the portion of the image at a first display position that is located directly underneath the operator in a depth direction, to the changed image which comprises a shifting into the display of the at least the portion of the image at the first display position such that the at least the portion of the image is three-dimensionally projected into the display in the depth direction and visually depicted to be located a distance d perpendicularly downward from a surface of the display and also located a distance perpendicularly downward from the operator such that the at least the portion of the image is shifted into unobstructed view from a previous condition of being at least partially visually obstructed behind the operator.

19. An information processing apparatus, comprising:
a storage medium storing a program; and
a processor configured to execute the program to cause the information processing apparatus to:
generate a first signal to cause a display to display an image;

receive a proximity signal indicative of a user input to a touch panel of the information processing apparatus;

receive a rotation signal indicative of a rotation of the information processing apparatus; and when the rotation signal indicates a rotation while the proximity signal indicates a user input, generate a second signal to cause the display to change the image, wherein the second signal is generated to cause the display to change the image by offsetting, based on a direction of the rotation of the information processing apparatus, at least a portion of the image with respect to the display, wherein the offsetting of at least the portion of the image brings into clearer view an area of the image, located at a position of the display corresponding to the position of the user input, that is at least partially visually obstructed behind an operator that provides the user input, and wherein the at least the portion of the image is offset in a direction such that the area of the image located at the position of the display corresponding to the position of the user input is visually depicted as being offset, from an initial displaying of the at least the portion of the image at a first display position that is located directly underneath the operator in a depth direction, to the changed image which comprises a shifting into the display of the at least the portion of the image at the first display position such that the at least the portion of the image is three-dimensionally projected into the display in the depth direction and visually depicted to be located a distance d perpendicularly downward from a surface of the display and also located a distance perpendicularly downward from the operator such that the at least the portion of the image is shifted into unobstructed view from a previous condition of being at least partially visually obstructed behind the operator.

20. An information processing apparatus, comprising:

a display;

touch acquisition means for receiving a proximity signal indicative of a user input to a touch panel of the information processing apparatus;

rotation acquisition means for receiving a rotation signal indicative of a rotation of the information processing apparatus; and display control means for:
  generating a first signal to cause the display to display an image; and
  when the rotation signal indicates a rotation while the proximity signal indicates a user input, generating a second signal to cause the display to change the image, wherein the second signal is generated to cause the display to change the image by offsetting, based on a direction of the rotation of the information processing apparatus, at least a portion of the image with respect to the display, wherein the offsetting of at least the portion of the image brings into clearer view an area of the image, located at a position of the display corresponding to the position of the user input, that is at least partially visually obstructed behind an operator that provides the user input, and wherein the at least the portion of the image is offset in a direction such that the area of the image located at the position of the display corresponding to the position of the user input is visually depicted as being offset, from an initial displaying of the at least the portion of the image at a first display position that is located directly underneath the operator in a depth direction, to the changed image which comprises a shifting into the display of the at least the portion of the image at the first display position such that the at least the portion of the image is three-dimensionally projected into the display in the depth direction and visually depicted to be located a distance d perpendicularly downward from a surface of the display and also located a distance perpendicularly downward from the operator such that the at least the portion of the image is shifted into unobstructed view from a previous condition of being at least partially visually obstructed behind the operator.

* * * * *